June 4, 1968     S. WEINER     3,386,133
SAFETY MECHANISM FOR PLASTIC INJECTION MOLDING
MACHINE OR THE LIKE
Filed May 31, 1966     2 Sheets-Sheet 1

INVENTOR
SEYMOUR WEINER
BY McCormick, Paulding & Huber
ATTYS.

INVENTOR
SEYMOUR WEINER
BY McCormick, Paulding & Huber
ATTYS.

United States Patent Office 3,386,133
Patented June 4, 1968

3,386,133
SAFETY MECHANISM FOR PLASTIC INJECTION MOLDING MACHINE OR THE LIKE
Seymour Weiner, Springfield, Mass., assignor to Package Machinery Company, East Longmeadow, Mass., a corporation of Massachusetts
Filed May 31, 1966, Ser. No. 553,788
8 Claims. (Cl. 18—30)

This invention relates to an improved safety mechanism for a plastic injection molding machine or a die-casting machine or for any other press type machine having relatively movable die or mold elements and a movable gate or guard to prevent operator access between the die elements during closing movement thereof.

Such machines generally comprise a frame which supports a base or stock and a fixed or stationary die or mold (for convenience, the term "die" will be used hereinafter). A movable die is supported on suitable guide structure and operated to move relative to the base or stock toward and away from a closed position with respect to the stationary die. It is a common practice to provide a manually operable safety gate or guard which must be closed to prevent operator access to the space between the dies before the machine can be operated. Such gates, when opened, operate mechanical, electrical and/or hydraulic means which render the machine inoperable until the gate is again closed.

It is the general object of the present invention to provide an extremely simple and foolproof gate-operated mechanical safety mechanism for such machines, and it is a more specific object to provide such mechanism with means for automatic adjustment to compensate for any adjustment of the base or stock which may be required to accommodate different spacing of the dies in open position. Thus, there can be no oversight or failure to adjust the safety mechanism when adjustment of the base or stock has been called for and accomplished, and no time is required by the operator for safety mechanism adjustment after initial installation or setup.

As will be described more fully, the safety mechanism can be used to particular advantage in plastic injection molding machines and in die-casting machines wherein the machine frame is horizontal and it has a base or stock which is supported for horizontal adjustment on one or more beams which also constitute a part of the machine frame. One die member moves horizontally on said beams and on other guide structure including at least one guide rod which moves with the said one die and thus moves axially through a suitable support opening in the base or stock.

A gate is movable on the frame toward and away from a closed position wherein it prevents the machine operator from thrusting any part of his body into the die area. This gate carries a first cam which operates a follower movably supported on the frame, and the follower in turn operates a motion transmitting means which carries a second cam. The second cam engages a latch only when the gate is substantially closed to move it from retaining engagement with the guide rod. Thus, the guide rod and movable die can be moved relative to the base or stock toward closed position only when the gate is substantially closed.

The gate is provided with an arm or other means so that when the operator returns the gate to the closed position, the motion transmitting means will be engaged by the said arm to move it so that the second cam will engage the latch to remove it from locking engagement with the guide rod. With this sort of arrangement, whenever the base or stock is adjusted on the frame, the position of the motion transmitting means should also be adjusted to assure proper operation. In accordance with the invention, means is provided for automatically adjusting the position of the motion transmitting means whenever the base or stock is adjusted.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Figure 1:
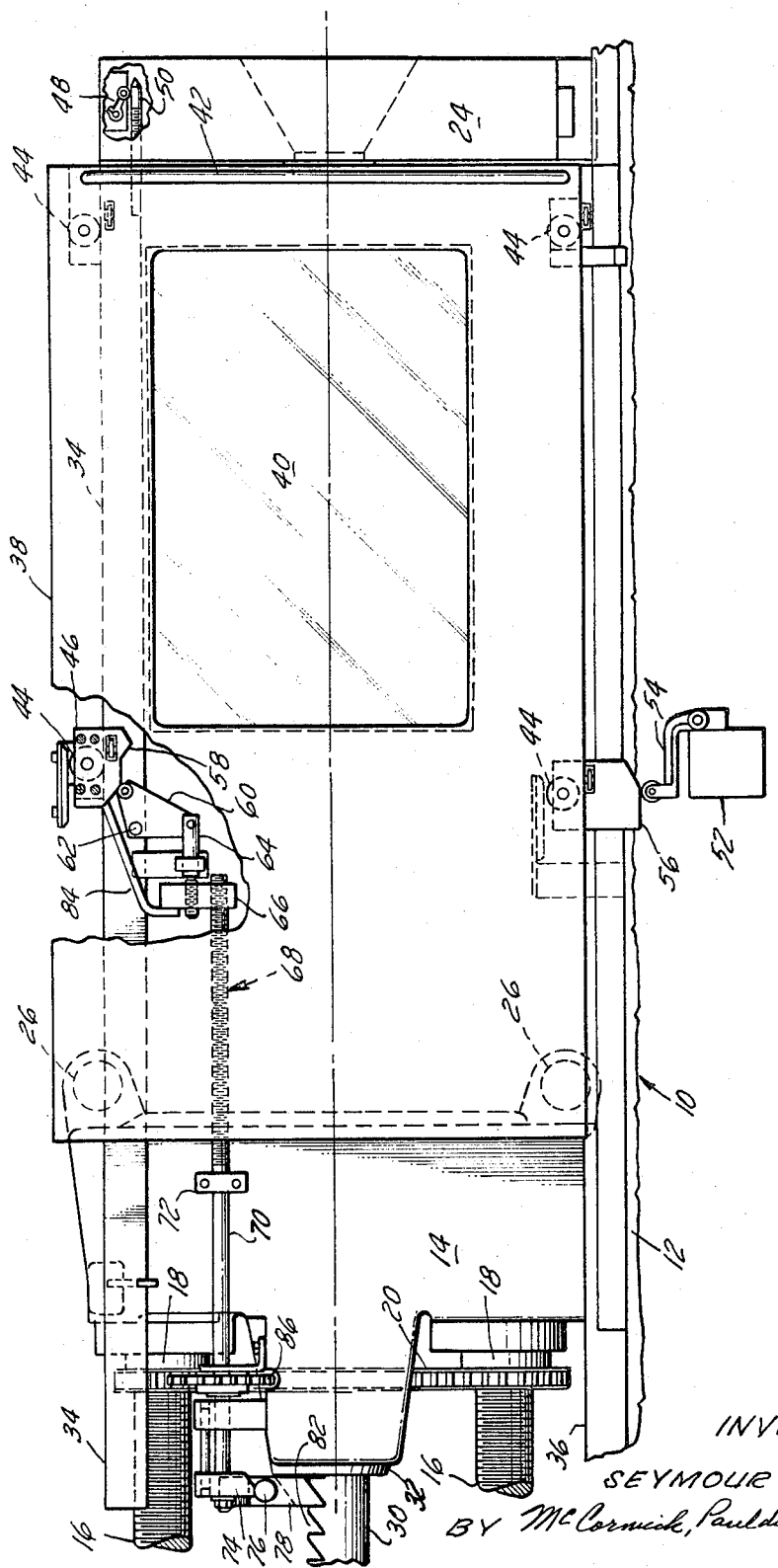
FIG. 1 is a front elevational view of so much of a plastic injection molding machine or the like which incorporates the safety mechanism of this invention.
Figure 2:
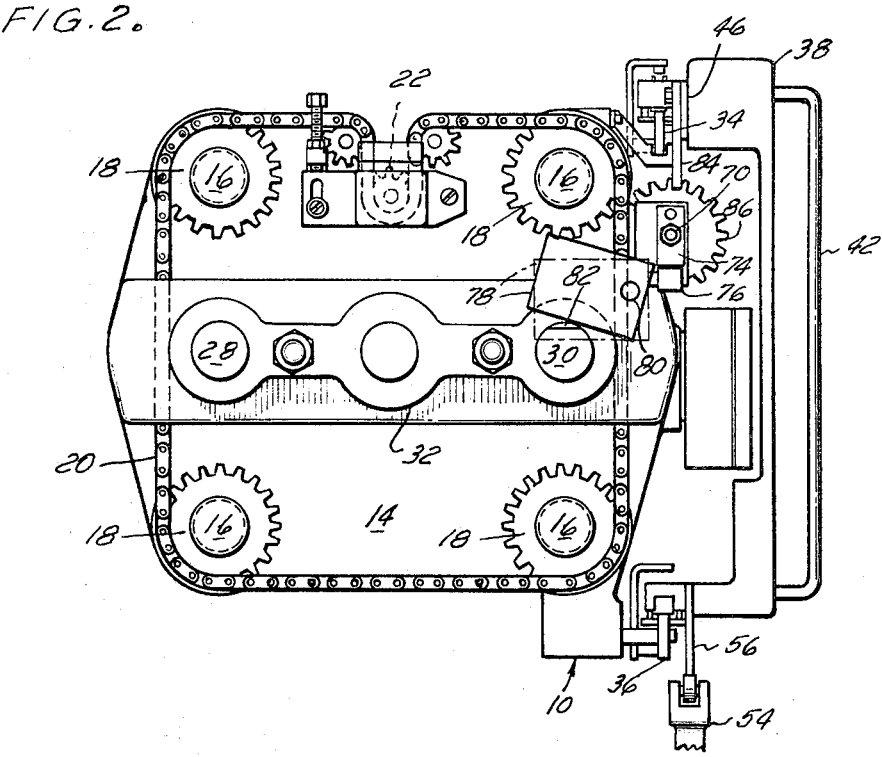
FIG. 2 is a left-hand end view of the structure shown in FIG. 1.

In FIG. 1 the machine frame is indicated generally by the reference number 10 and it includes a horizontal bed 12 supporting a vertically disposed base or stock 14 which extends traversely of the machine. The said base or stock can be adjusted longitudinally of the frame bed 12 (left and right as viewed in FIG. 1) along horizontally disposed support beams 16, 16 which are fixedly mounted and thus can be considered a part of the machine frame 10. As seen in FIGS. 1 and 2, there are four such support beams provided and their left-hand end portions are threaded to receive sprocket nuts 18, 18 which are rotatably mounted on the base or stock 14 at the left hand face thereof. An endless chain 20 is entrained around the four sprocket nuts 18, 18 and it is engaged and driven by a selectively operable drive sprocket 22. The drive to the sprocket 22 is reversible so that all four nut sprockets 18, 18 can be rotated simultaneously either in a clockwise direction or a counterclockwise direction as viewed in FIG. 2. Whenever the nut sprockets 18, 18 are driven, the base or stock 14 is adjusted horizontally toward the left or toward the right (FIG. 1), depending upon the direction of rotation of the said nut sprockets.

The machine frame 10 also includes a rigidly mounted bolster or support plate 24 which extends vertically and transversely of the bed 12 in spaced relationship to the base or stock 14. The plate 24 mounts a stationary die element (not seen) and a movable die (not shown) is connected by means of suitable linkages to journals 26, 26 on the base or stock 14 so that the said movable die can be moved relative to the base 14 toward and away from a closed position with respect to the said fixed die. This, of course, constitutes horizontal longitudinal movement along the machine bed 12, and such movement of the die is provided along suitable guide structure which can include that portion of the beams 16, 16 between the base 14 and the fixed die support 24. The guide structure also includes a pair of horizontally disposed guide rods 28, 30 which move with the movable die element through suitable openings in the base or stock 14. Said openings in the base 14 extend through an outwardly projecting end boss 32 on the said base or stock.

The machine frame 10 further includes an upper guide rail 34 and a lower guide rail 36 both of which extend horizontally and longitudinally of the machine to slidably support a safety gate 38. The said gate is shown in its closed position in FIG. 1, and it will be observed that it covers the space between the base or stock 14 for the movable die member and the support 24 for the fixed die member. Thus, when the gate 38 is in closed position, the machine operator is prevented from thrusting any part of his body into the die area. However, he can observe die operation through a window 40 provided in the gate, and he can move the gate from closed position and return it to closed position by means of a handle 42. The gate is supported for sliding horizontal movement along the upper and lower guide rails 34 and 36 on rollers 44, 44 rotatably mounted on brackets such as the bracket 46 carried by the gate 38.

As mentioned above, it is a conventional practice to provide electrical and/or hydraulic safety devices to prevent machine operation or movement of the dies when a safety gate is opened. Such safety devices may include a limit switch 48 which is normally open in a motor circuit to prevent operation of a pump providing hydraulic pressure for die movement. This limit switch 48 is engageable by a plunger 50 when the gate 38 is closed, the said plunger being carried by the gate, to close the limit switch and thus permit pump operation.

A conventional hydraulic safety includes a valve 52 having an operator 54 which is engaged by a cam 56 formed as a part of a bracket for a support roller 44 adjacent the lower rail 36. When engaged by the cam 56 in the closed position of the gate 38, the operator 54 actuates the valve 52 to permit hydraulic flow for die operation. Until the gate is closed, the valve 52 will be biased to a position preventing hydraulic flow for die operation.

As has also been mentioned, the mechanical safety mechanism provided in accordance with the present invention includes a first cam 58 which is conveniently formed as a part of the roller support bracket 46 so as to be carried with the gate 38. It will be seen that during opening and closing movement of the gate 38, the cam 58 engages a follower 60 which is pivotally supported at 62 to the frame or guide rail 34.

When the gate is moved from the closed position shown in FIG. 1 toward an open position, the cam 58 will pivot the follower 60 to the position shown in FIG. 2 wherein a plunger 64 carried by the follower in a lost motion connection shifts the position of a block 66 forming a part of motion transmitting means indicated generally by the reference number 68. The block 66 is threaded onto an elongated shaft 70 which also forms a part of the motion transmitting means, the said shaft being supported by a bracket 72 on the base or stock 14 for axial adjustment and movement during routine operation.

At its left-hand end, the shaft 70 supports a second cam 74 which is engageable with a follower roller 76 supported on a stub shaft extending from a latch 78 into the path of movement of the said second cam 74. The latch 78 is pivotally mounted at 80 on the projecting face 32 of the base or stock 14 so that when the follower 76 is engaged by the cam 74 the latch will be pivoted clockwise (FIG. 2) from a normal position to an elevated position. In its normal position, the latch 78 is gravity biased into engagement with one of a series of teeth 82 provided on the upper surface of the movable die guide rod 30.

Figure 3:
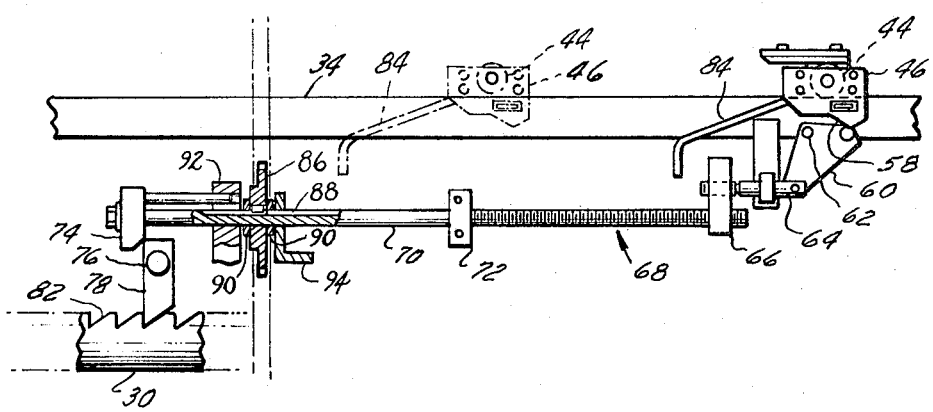
FIG. 3 is an elevational view of elements of the safety mechanism in the position they assume while the safety gate is being opened.

It will be seen by comparing FIGS. 1 and 3 that the second cam 74 will engage the latch follower 76 only when the gate 38 is substantially closed and the motion transmitting shaft 70 is in its right-hand position. Thus, the guide rod 30 will be disengaged to permit die movement only when the gate is closed. Whenever the gate is moved away from the substantially closed position and the motion transmitting shaft 70 is shifted toward the left by the first cam 58, the second cam 74 will disengage the latch follower 76 and the latch 78 will engage a tooth 82 to prevent die movement.

The motion transmitting shaft 70 will be moved axially toward the right to effect latch disengagement upon closing of the gate 38 by means of an arm 84 carried by the gate roller support bracket 46, the said arm engaging the block 66 to move it and the shaft 70 toward the right. Such movement also restores the follower 60 to its initial position wherein it can again be engaged by the cam 58 during opening movement of the gate 38.

It will be seen that if the base or stock 14 is adjusted longitudinally of the frame bed 12 to accommodate a new spacing between the die members, the motion transmitting means and shaft carried thereby will also be adjusted longitudinally relative to the frame and thus relative to the first cam follower 60. This would prevent proper operation of the safety mechanism. However, in further accord with the present invention a means is provided for automatically adjusting the position of the motion transmitting means while adjusting the position of the base or stock relative to the frame.

This means comprises a sprocket 86 which is keyed to the shaft 70 and which engages the stock adjusting chain 20. Thus, whenever the adjusting chain 20 is moved to adjust the stock, the sprocket 86 and shaft 70 are rotated. Such rotation of the shaft adjusts its threaded connection with the block 66. That is, whenever the base or stock is moved toward the left as viewed in FIG. 1, the shaft 70 is rotated by the adjusting chain 20 to be moved toward the left relative to the follower engaging block 66. Whenever the base or stock 14 is moved toward the right, the shaft 70 is threaded toward the right (FIG. 1) into the block 66, the said block being restrained from rotation with rotation of the shaft 70. Therefore, after initial installation and set-up for properly timed operation of the cam means including the first cam 58, the follower 60, the motion transmitting means 68, the second cam 74, and the latch 78, no further adjustment of the safety mechanism of this invention is required to accommodate adjustment of the base or stock 14.

In this connection, it is to be noted that the key connection between the sprocket 86 and the shaft 70 is such as to permit relative axial movement therebetween (for the normal axial shifting of the shaft 70 in the aforedescribed safety operation) and to prevent relative rotation therebetween (for the adjustment of the shaft 70 with the stock 14). That is, an elongated key slot 88 is provided in the shaft 70 to receive the key from the sprocket 86 so that there can be relative axial movement between them. The sprocket 86 is mounted on the shaft 70 between washers 90, 90 which butt against a block 92 and bracket 94, both secured to the machine frame, so that the sprocket cannot move axially with the said shaft. Therefore, the sprocket 86 is always retained in engagement with the adjusting chain 20, and when the sprocket is rotated by this chain, it rotates the shaft 70 to adjust its axial position relative thereto and relative to the stock as described.

The invention claimed is:

1. In a machine having a base or stock and one die movable relative thereto toward and from a fixed die on guide structure including at least one guide rod movable axially with said one die, and also having a frame and a gate movable thereon to and from a closed position wherein it prevents operator access between the dies, an improved safety mechanism comprising cam means operable by initial movement of said gate from closed position to engage said guide rod and block movement of said one die toward said fixed die until said gate is in closed position.

2. An improvement in a machine as set forth in claim 1 wherein said cam means includes a first cam movable with said gate, a follower engageable by said first cam and movably mounted on said frame, motion transmitting means operable by said follower and having a second cam thereon, and a latch actuated by said second cam to disengage said guide rod only when said gate is substantially closed, said guide rod being adapted for engagement by said latch.

3. An improvement in a machine as set forth in claim 1 wherein said cam means includes a first cam movable with said gate, a follower engageable by said first cam and movably mounted on said frame, an axially movable shaft engaged by said follower and having a second cam thereon, and a latch actuated by said second cam to disengage said guide rod only when said gate is substantially closed, said guide rod being provided with a series of teeth and the latch being movably mounted on said base or stock for engagement with said teeth to prevent movement of the guide rod, and thus said one die, relative to said base or stock.

4. An improvement in a machine as set forth in claim 1 wherein said cam means includes a first cam movable with said gate, a follower movably mounted on said frame and engageable by said first cam during movement of said gate toward and from closed position, an axially movable shaft having a block thereon which is engaged by said follower to move said block and shaft in one direction when said gate is moved from closed position and also having a second cam thereon, a latch actuated by said second cam to disengage said guide rod only when said gate is substantially closed, said guide rod being provided with a series of teeth and the latch being movably mounted on said base or stock for engagement with said teeth to prevent movement of the guide rod, and thus said one die, relative to said base or stock, and means carried by said gate to engage said block to move it and said shaft opposite to said one direction when said gate is being closed and thereby to disengage said latch from the guide rod when the gate is closed.

5. The improvement defined in claim 4 wherein said block and shaft are adjustably connected to adjust the position of the block on the shaft.

6. In a machine having a frame, at least one threaded support beam, a stock mounted on said beam for adjustment relative to the frame, the stock rotatably supporting a nut in threaded engagement with the beam, and also having one die movable relative to said stock toward and from a fixed die on guide structure which includes at least one guide rod movable axially with said one die, and further having a gate movable on the frame to and from a closed position wherein it prevents operator access between the dies, an improved safety mechanism comprising a first cam movable with said gate, a follower engageable by said first cam and movably mounted on said frame, motion transmitting means adjustably mounted on said stock for engagement and operation by said follower and carrying a second cam, a latch carried by said stock and normally engaging said guide rod to prevent movement of said one die but operable by said second cam to disengage said guide rod only when said gate is substantially closed, and means for rotating said nut to adjust the position of said stock relative to the frame for die spacing while simultaneously adjusting the motion transmitting means on said stock for such die spacing.

7. An improved safety mechanism as set forth in claim 6 wherein said motion transmitting means comprises an elongated shaft supported by said stock for axial adjustment and also for axial movement effected by opening and closing of said gate, and wherein said means for rotating said nut to adjust the position of the stock relative to the frame also adjusts said elongated shaft axially relative to said stock.

8. An improved safety mechanism as set forth in claim 7 wherein a block is threaded onto said shaft for engagement by said follower to move said shaft axially in one direction when said gate is moved from closed position, wherein said shaft is adjusted axially relative to the stock by rotating it in said block, and wherein means carried by said gate engages said block to move said shaft axially opposite to said one direction when said gate is being closed, thereby to disengage the latch from the guide rod when the gate is closed.

References Cited

UNITED STATES PATENTS

| | | |
|---|---|---|
| 644,811 | 3/1900 | Sylvester. |
| 2,371,195 | 3/1945 | Strauss. |
| 3,184,810 | 5/1965 | Hoern _____ 18—3 |

FOREIGN PATENTS

| | | |
|---|---|---|
| 1,088,881 | 9/1954 | France. |
| 854,902 | 11/1960 | Great Britain. |

J. HOWARD FLINT, JR., *Primary Examiner.*